ary Examiner—Ramon S. Britts
United States Patent [19]
Bagheri et al.

[11] 4,090,544
[45] May 23, 1978

[54] ALL METAL SELF-LOCKING SCREW FASTENER

[75] Inventors: Mansour A. H. Bagheri, Downey; Donald W. Stillman, Playa del Rey, both of Calif.

[73] Assignee: Long-Lok Fasteners Corporation, Cincinnati, Ohio

[21] Appl. No.: 482,470

[22] Filed: Jun. 24, 1974

Related U.S. Application Data

[60] Division of Ser. No. 288,742, Sep. 13, 1972, Pat. No. 3,843,984, which is a continuation-in-part of Ser. No. 8,454, Feb. 4, 1970, abandoned.

[51] Int. Cl.² ........................................... F16B 39/284
[52] U.S. Cl. .................................................. 151/14 R
[58] Field of Search ................................ 151/14 R, 22

[56] References Cited

U.S. PATENT DOCUMENTS

| 2,869,607 | 1/1959 | Widmann | 151/14 R |
| 3,027,042 | 3/1962 | Graves | 151/22 |
| 3,212,547 | 10/1965 | McKay et al. | 151/14 R |
| 3,249,142 | 5/1966 | Phipard | 151/22 |
| 3,358,726 | 12/1967 | Gabbey | 151/22 |
| 3,426,642 | 2/1969 | Phipard | 151/22 |
| 3,479,675 | 11/1969 | Ricca | 151/22 |
| 3,643,722 | 2/1972 | Oestericher | 151/22 |

*Primary Examiner*—Ramon S. Britts
*Attorney, Agent, or Firm*—George F. Smyth

[57] ABSTRACT

An externally screw threaded fastener body is bored longitudinally to form a bore having a reduced inner axial portion and an outer axial portion of enlarged diameter and a noncircular mandrel is forced into the bore to expand the reduced inner portion thereof and thereby form at least one radially outwardly protruding lobe for local increase in the pitch diameter of the external screw thread. The fastener body may then again be drilled longitudinally, the final result being a fastener, at least a portion of which is tubular with a relatively thin resilient circumferential wall having at least one radially outward lobe.

14 Claims, 45 Drawing Figures

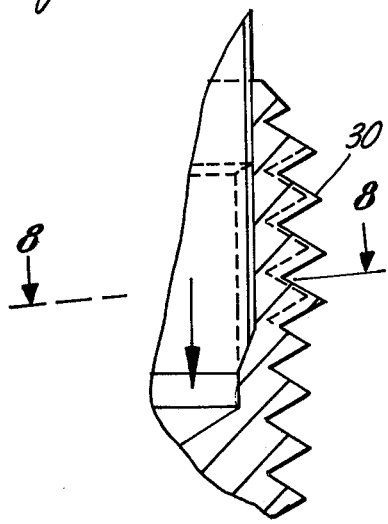
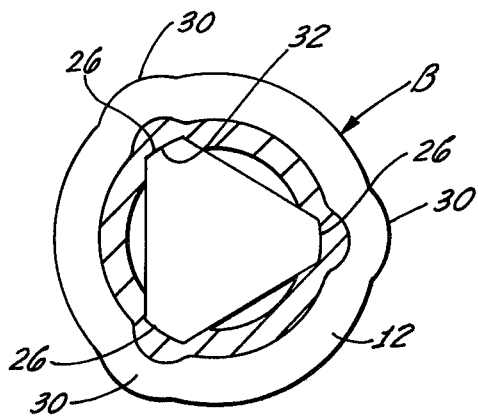
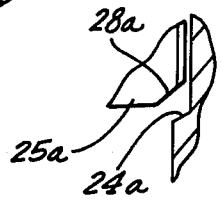
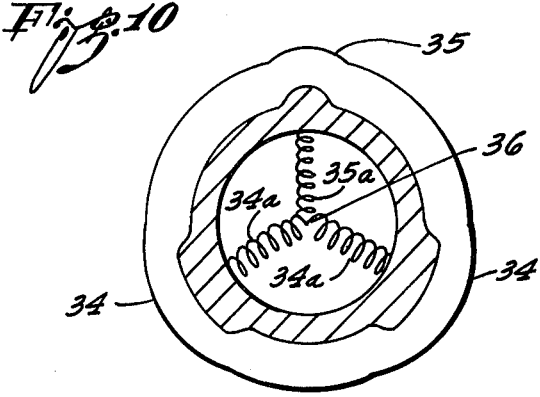
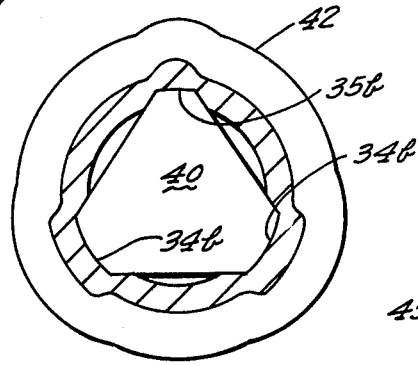
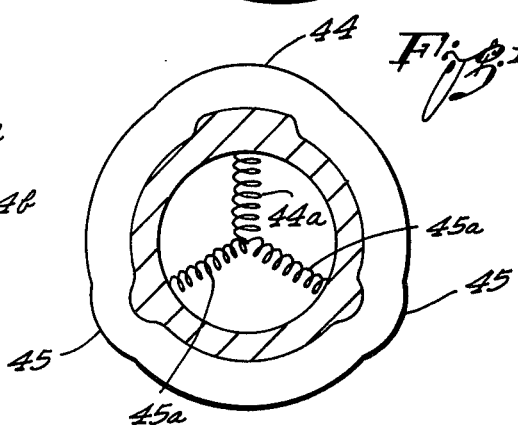

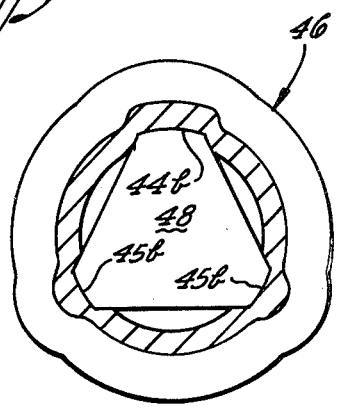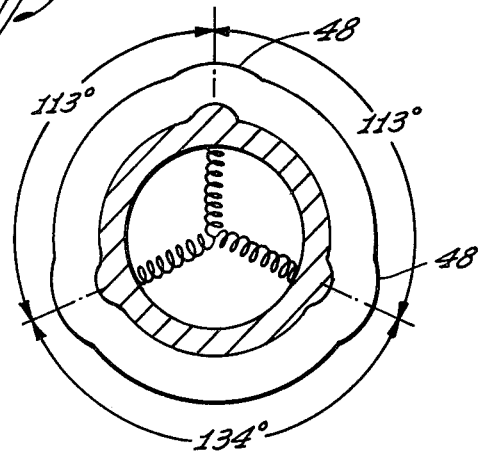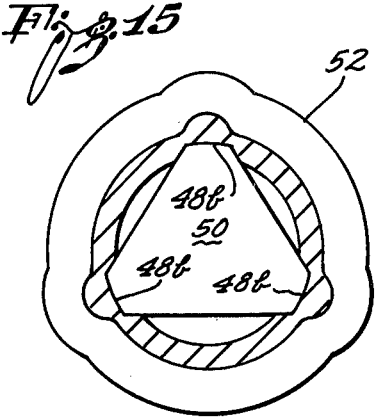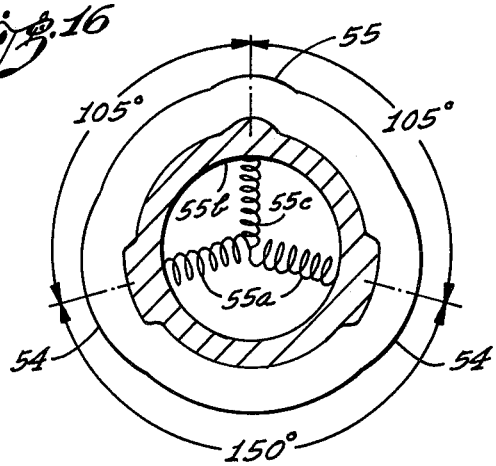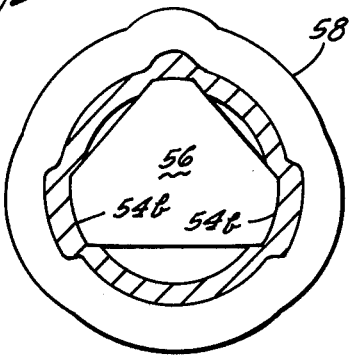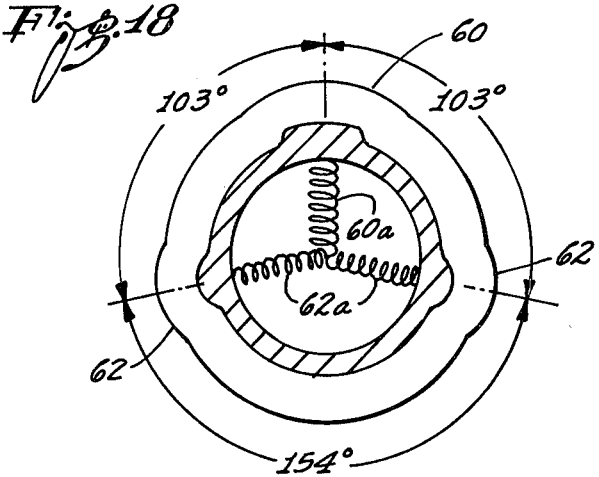

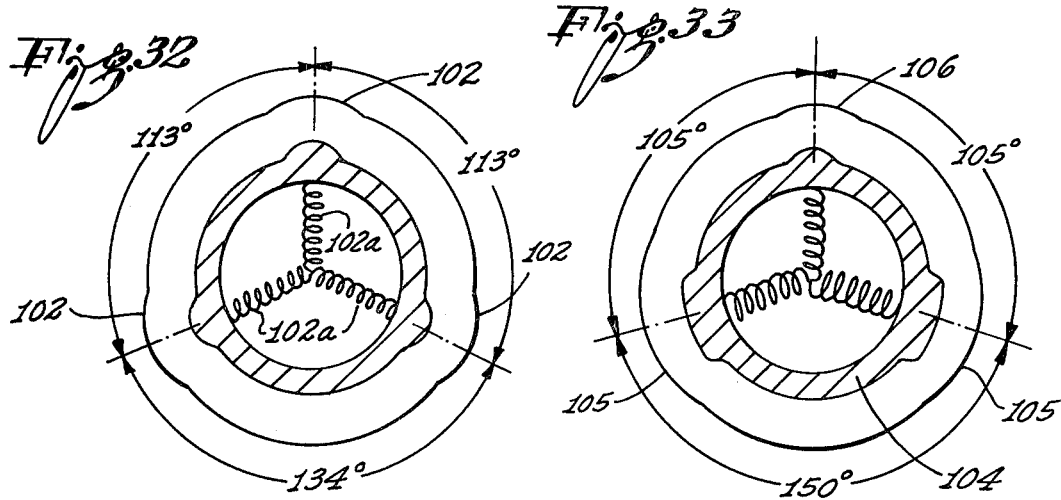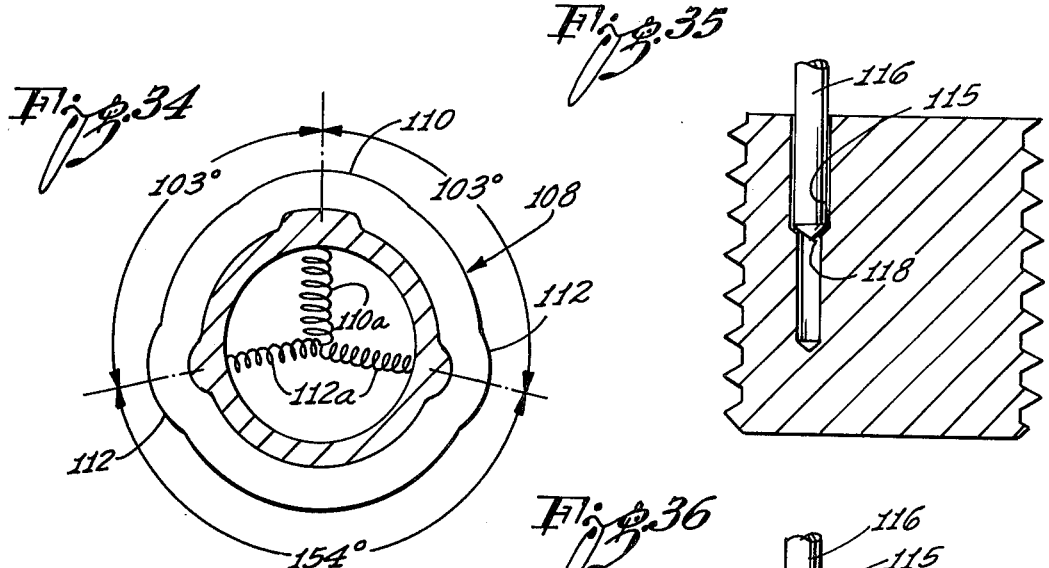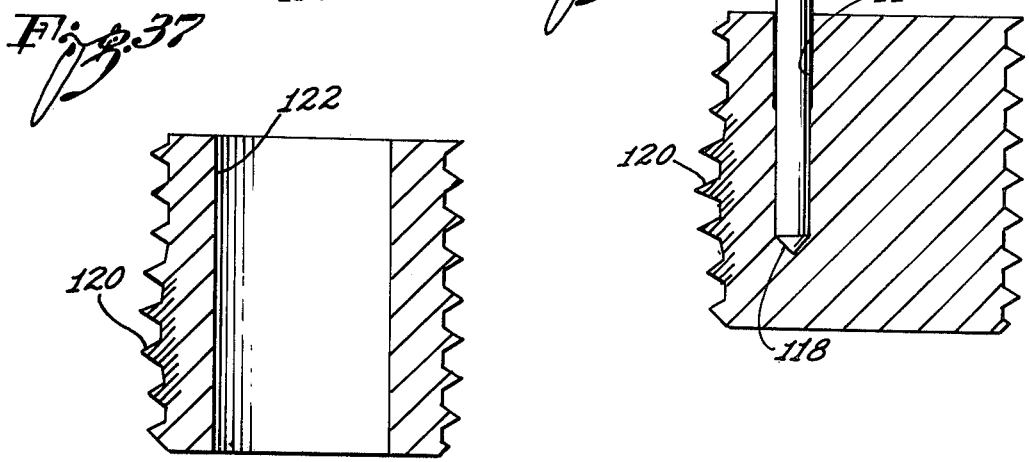

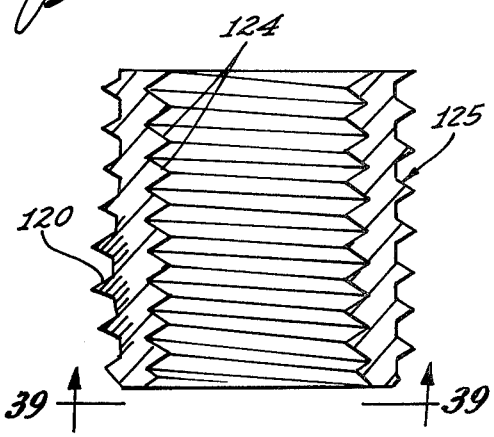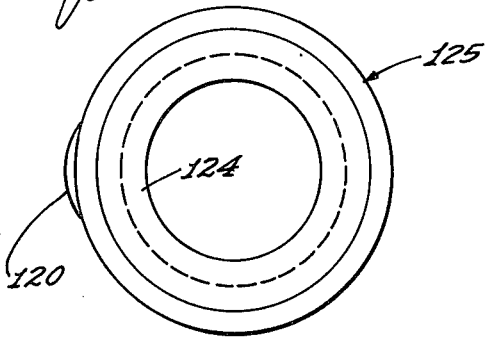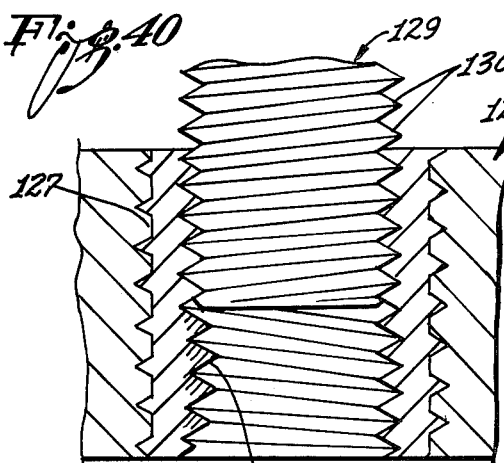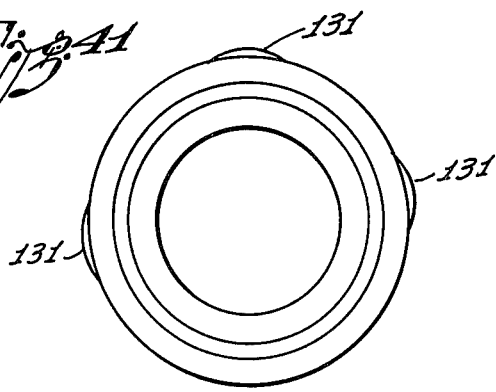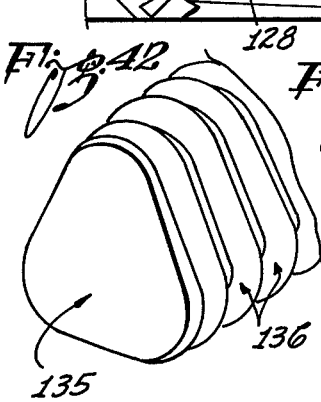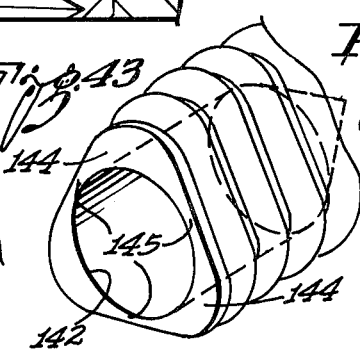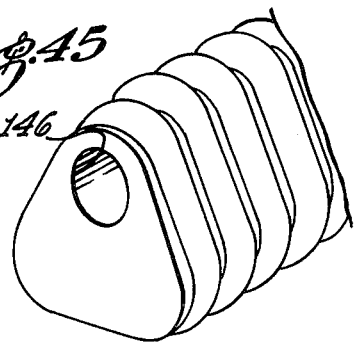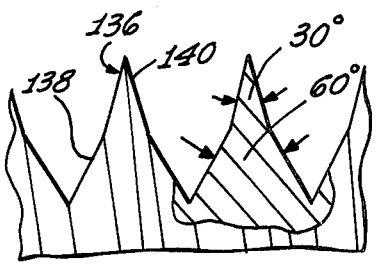

ALL METAL SELF-LOCKING SCREW FASTENER

RELATIONSHIP TO PRIOR PATENT APPLICATIONS

This is a divisional application of application Ser. No. 288,742, filed Sept. 13, 1972, now U.S. Pat. No. 3,843,984, which is a continuation-in-part of application Ser. No. 8,454, filed Feb. 4, 1970, now abandoned.

BACKGROUND OF THE INVENTION

An all metal self-locking externally threaded screw fastener should meet certain well known requirements. It should have excellent performance at temperatures as high as 1200° F and should be consistent and uniform in its torque characteristics. It should have minimum sensitivity to a wide range of thread sizes and fits, which is to say that it should be capable of self-locking cooperation with a wide range and wide variety of complementary screw threads and its capability for reuse should also remain high for a wide variety of complementary screw threads. In addition, it should have excellent reusability, i.e., in a test of a number of cycles, say 15 cycles, the installation torque and the breakaway torque should not drop below acceptable values.

The present invention relates to all-metal screw fasteners of the type that function for locking action by resilient deformation within their elastic limits as distinguished from solid non-yielding fasteners and, more specifically, the invention relates to elastic screw threaded fasteners that are fabricated by conversion deformation as disclosed, for example, in the McKay et al. U.S. Pat. No. 3,245,096 and the Gabbey U.S. Pat. No. 3,358,726.

The fabrication methods of these two prior art patents are characterized by boring and counterboring the leading end of an externally threaded screw to produce a longitudinal bore therein of stepped configuration which bore has an inner circumferential shoulder providing a transition from the outer larger portion of the bore to the axially inward reduced portion of the bore. A suitable mandrel, punch or the equivalent of greater cross-sectional dimension than the reduced inner portion of the bore is then forced into the reduced inner portion to displace the metal with consequent local radial bulging of the screw and consequent increase in the pitch diameter of the external screw thread for self-locking cooperation with a complementary internal screw thread.

By virtue of some degree of elasticity, such prior art screw fasteners are superior to solid screw fasteners that depend solely on non-yielding interference fit with complementary screw thread. The locking torque of a solid screw is developed only by permanently deforming the complementary screw thread with consequent limiting of the reusability of the screw. Another disadvantage is that when a solid screw is used, close tolerance in the dimensioning of the two cooperating screw threads is required because only a light change in the clearance of the mating threads causes an inordinately large change in the self-locking torque. If the clearance is too scant, galling or seizure may occur and, on the other hand, only a slight increase in the clearance may defeat the self-locking action.

Although the prior art screw fasteners of some degree of resilience produced by conversion deformation are substantially superior to solid non-yielding screw fasteners, nevertheless such screw fasteners are found wanting in various respects. In general, the elastic deformation is too limited to enable the self-locking effectiveness of the screw fastener to survive a desirable number of cycles of reuse. In addition, the range of deformation of such a prior art hollow elastic screw is not sufficient for self-locking action with a wide variety of thread sizes, fits and materials. A further serious defect is that the heretofore prevalent methods of conversion deformation of a screw body do not permit close control and predictability as required for the quantity production of uniformly efficient self-locking fasteners.

In another prior art conversion deformation process, the bored and counterbored screw is externally deformed to convert the bore into an elliptical cavity which results in self-locking action at two diametrical opposite sides of the screw. It has been found that while such an elliptically deformed screw may have substantial elasticity, it tends to loose its locking torque under a clamping or seating load.

The broad object of the present invention is to eliminate these shortcomings of prior art screws that are produced by conventional conversion deformation.

SUMMARY OF THE INVENTION

Underlying the invention is the discovery of a serious inherent defect in the conventional method of conversion deformation wherein a rounded nose punch of circular cross-sectional configuration is forced into the stepped bore of the screw body. The transition shoulder of the stepped bore is a sloping shoulder having a straight line profile at some given angle of taper relative to the axis of the stepped bore and the rounded nose of the punch makes tangential contact with the sloping surface of the shoulder.

In the first place, if the inner reduced portions of successive stepped bores vary only slightly in inside diameter, the initial angle of tangential contact between the punch and the contact shoulder varies correspondingly with corresponding variation in the pattern of flow displacement of the metal. In the second place, the circular line of contact of the rounded nose punch with the sloping transition shoulder is initially at the radially inner edge or inner diameter of the transition shoulder but as the metal yields to the punch, the contact zone of the transition shoulder widens in radial dimension and at the same time the contact zone of the rounded nose of the punch also expands radially and in doing so spreads around the curvature of the nose towards the longitudinal cylindrical surface of the punch with corresponding progressive change in the angle of friction contact between the advancing punch and the transition shoulder. Consequently, only a minor portion of the axial force exerted by the punch is converted into radially outward force against the metal and, moreover, the force conversion is nonlinear to make it difficult both to control and to predict the pattern of metal flow. It has been found that actually a substantial portion of the metal of the screw body is simply shoved into the reduced bore instead of flowing radially. Another disadvantage is that such severe treatment of the metal tends to develop minute cracks in the screw body.

The invention teaches that this inherent defect in the prior art fabrication procedure may be avoided by employing a punch that has a conical or beveled nose.

Another discovery underlying the invention is the advantage of using a punch of noncircular configuration, the punch having one or more radial lobes to create correspondingly one or more outer radial lobes in the externally threaded portion of the screw fastener. Such a punch of noncircular configuration formed with radial lobes provides room for metal to flow toward the opposite sides of the lobes of the punch. Thus, the metal is subjected to substantially less severe treatment.

A still further discovery is that forming a hollow screw fastener with three circumferentially protruding lobes is advantageous in providing a three-point locking action and a further discovery is that if the three lobes of the hollow screw are asymmetrical there is a striking increase in the range of sizes and configurations of complementary screw threads with which the elastic screw will cooperate with effective locking action. The provision of lobes discourages galling and seizure by providing circumferentially spaced clearance spaces for loose metal particles and arranging the lobes asymmetrically increases the flexibility and elasticity of the screw fastener to reduce the degree to which the locking torque is affected by variations in the dimensions of complementary screw threads.

The preferred practices of the invention are further characterized by the concept of reboring the screw fastener body concentrically after the conversion deformation of the screw body by the punch. The advance of the radial lobe or lobes of the punch into the reduced portion of the bore forms corresponding longitudinal recesses in the wall of the reduced bore and preferably but not necessarily the diameter of the final bore is large enough to eliminate these recesses.

It is a simple matter to vary the diameter of the final bore to vary the thickness of the cylindrical wall of the screw fastener and thereby vary the elasticity of the screw. Thus, the final configuration of the screw fastener in the preferred practice of the invention is characterized by a circumferential wall that has three asymmetrical lobes, the wall being thickened at each lobe but otherwise being of uniform thickness. The asymmetrical arrangement of the lobes to provide differing spring rates at the lobes may be achieved by unequally spacing the lobes circumferentially of the screw fastener or by making the dimensions of the lobes unequal as measured circumferentially of the screw fastener or by both unequally spacing the lobes and unequal dimensioning the lobes.

A further feature of the invention is that the new fabrication technique may be employed not only to produce self-locking screws but also to produce self-locking screw-threaded tubular inserts.

The features and advantages of the invention may be understood from the following detailed description and the accompanying drawings.

BRIEF DESCRIPTION OF THE DRAWINGS

In the drawings, which are to be regarded as merely illustrative:

FIG. 7 is a fragmentary sectional view similar to FIG. 4 showing the noncircular punch advanced into the reduced portion of the bore of the screw body;

FIG. 8 is a transverse section along the line 8—8 of FIG. 7 showing how the noncircular punch deforms the screw body to provide the screw body with three circumferentially spaced outwardly protruding lobes;

FIG. 9 is a fragmentary sectional view similar to FIG. 7 showing how a punch with a different taper angle may be employed in a bore having a curved conical surface that is also of a different taper angle;

FIG. 10 is a sectional view similar to FIG. 3 showing a three-lobe screw wherein two of the lobes are of greater circumferential dimension than the third lobe with the three lobes equally spaced circumferentially as measured from center to center;

FIG. 11 is a view similar to FIG. 8 showing how a punch is employed to form the three lobes shown in FIG. 10;

FIG. 12 is a view similar to FIG. 10 showing a three-lobe screw with one lobe of greater circumferential extent than the other two lobes and with the three lobes at equal circumferential spacing as measured from the centers of the lobes;

FIG. 13 is a view similar to FIG. 11 showing how a punch produces the lobes shown in FIG. 12;

FIG. 14 is a view similar to FIG. 12 showing a three-lobe screw with the three lobes of equal dimensions as measured circumferentially of the screw but with the three lobes unequally spaced around the circumference of the screw;

FIG. 15 is a view similar to FIG. 13 showing how a punch forms the three lobes of the screw shown in FIG. 14;

FIG. 16 is a view similar to FIG. 14 showing a three-lobe screw with two lobes of greater circumferential extent than the third lobe and with the three lobes unequally spaced circumferentially of the screw;

FIG. 17 is a view similar to FIG. 15 showing how a punch may be employed to form the three lobes of the screw shown in FIG. 16;

FIG. 18 is a view similar to FIG. 16 showing a three-lobe screw having one lobe of greater circumferential extent than the other two lobes with the three lobes unequally spaced circumferentially of the screw;

FIG. 32 is a sectional view similar to FIG. 31 showing a threaded tubular insert with three unequally spaced lobes of equal circumferential dimensions;

FIG. 33 is a sectional view similar to FIG. 32 showing a three-lobe tubular insert with two of the lobes larger than the third lobe and with the three lobes at unequal spacing circumferentially of the insert;

FIG. 34 is a view similar to FIG. 33 showing a three-lobe tubular insert with one lobe larger than the other two lobes and with the three lobes at unequal spacing circumferentially of the insert;

FIG. 35 is a sectional view illustrating the initial steps in the production of an internally and externally threaded tubular insert having a single radially protruding lobe;

FIG. 36 shows the punch advanced in the bore of the threaded body shown in FIG. 35 to produce a single radially protruding lobe;

FIG. 37 shows the result of boring the body shown in FIG. 36 to a uniform inside diameter;

FIG. 38 shows the result of tapping the axial bore shown in FIG. 37 to produce the final tubular insert with a single radial lobe;

FIG. 39 is an end view of the tubular insert as seen along the line 39—39 of FIG. 38, the view showing the single lobe of the insert;

FIG. 40 is a view similar to FIG. 38 showing how the insert is flexed radially inwardly by a surrounding internally threaded member to cause the insert to cooperate for locking action with an inserted screw;

FIG. 41 is an end elevation of a tubular insert with three relatively small radial lobes;

FIG. 42 is an enlarged perspective view of the leading end of an externally threaded screw that is rolled to a cross-sectional configuration of a triangle with rounded corners;

FIG. 43 is a similar view showing how the addition of an axial bore in the leading end of the screw shown in FIG. 42 converts the solid screw into a hollow elastic screw;

FIG. 44 is a greatly enlarged fragmentary sectional view showing the preferred configuration of the thread of the screw shown in FIG. 43; and FIG. 45 is an enlarged fragmentary perspective view similar to FIG. 44 showing how the leading end of the screw may be provided with a smaller blind bore near one of the rounded corners of the triangular cross-sectional configuration of the screw.

DESCRIPTION OF THE PREFERRED EMBODIMENTS OF THE INVENTION

Figure 1:
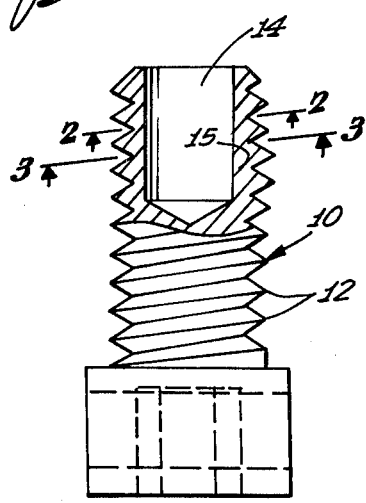
FIG. 1 is an elevational view partly in section showing a selected embodiment of the invention in the form of an externally threaded screw, the section being taken along the line 1—1 of FIG. 3.
Figure 2:
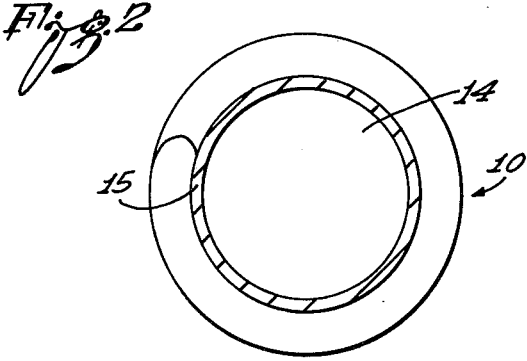
FIG. 2 is a transverse section taken along the line 2—2 of FIG. 1.
Figure 3:
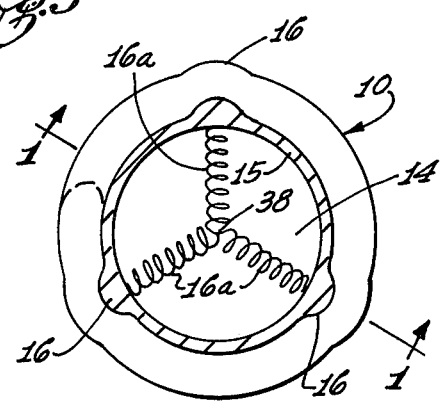
FIG. 3 is a transverse section taken along the line 3—3 of FIG. 1 and showing the three outwardly protruding lobes of the screw.

FIG. 1 shows an embodiment of the invention in the form of a screw, generally designated 10, having an external screw thread 12, the screw having a concentric blind bore 14 in its leading end to make the leading end of the screw tubular in configuration with a circumferential wall 15. As shown in FIG. 2 the leading end of the screw is of conventional cross-sectional configuration but as shown in FIG. 3 the circumferential wall 15 is formed with three radially protruding lobes 16, the three lobes being of equal dimensions and being equally spaced circumferentially of the screw. It is to be noted that except where the circumferential wall 15 is thickened to form the three lobes 16, the circumferential wall is of uniform radial dimension or thickness.

The diameter of the bore 14 is selected to give the circumferential wall 15 the thickness that is required for whatever degree of elasticity may be desired. To understand how the screw functions for self-locking cooperation with a complementary internal screw thread, the circumferential wall shown in FIG. 3 is to be considered as divided into three equal sectors with a lobe 16 in the middle of each sector. Each of the three sectors functions in effect as a leaf spring with the corresponding lobe 16 in the middle of the leaf spring and with two arms of the leaf spring extending in opposite circumferential directions from the lobe. Since the three lobes 16 are of equal dimensions and are equally spaced circumferentially of the screw, the three sectors function as three springs with equal spring rates. Thus, as indicated diagrammatically in FIG. 3, the three equally spaced and equally dimensioned lobes 16 are theoretically equivalent in function to three radial coil springs 16a that are interconnected at their inner ends and that exert radially outward pressure at three points to resist radially inward displacement of the lobes by a complementary internal screw thread.

Figure 4:
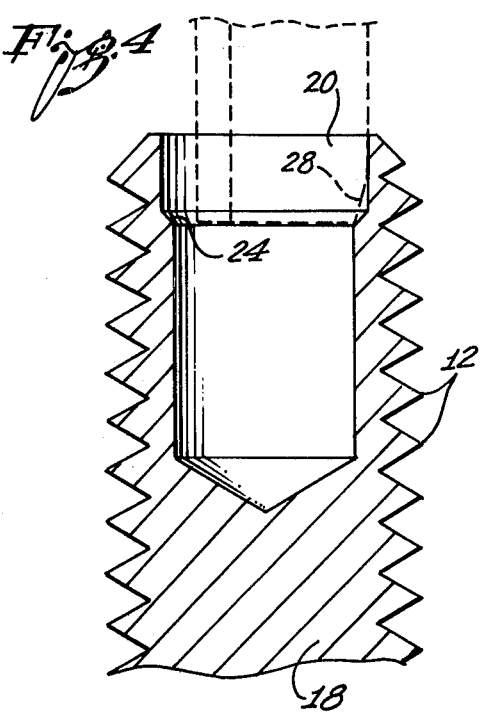
FIG. 4 is an enlarged fragmentary view showing how the leading end of the screw may be initially bored in preparation for conversion deformation of the screw body by a noncircular punch.

FIGS. 4 to 8 illustrate the important steps in the method of fabricating the screw 10. First, a conventional screw 18 having the desired external screw thread 12 is fabricated in the conventional manner and then the leading end of the screw is bored and counterbored to form an axial bore as shown in FIG. 4. The axial bore shown in FIG. 4 has an outer end portion 20 of enlarged diameter and an inner end portion 22 of reduced diameter with the end portion 20 including a conically curved circumferential surface 24.

Figure 5:
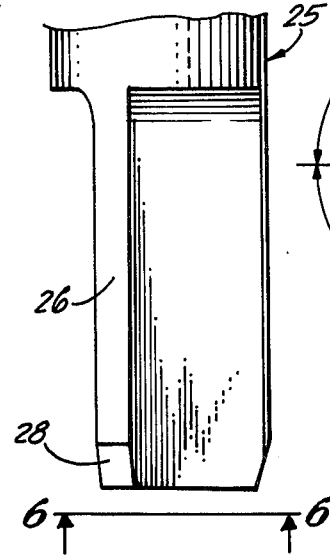
FIG. 5 is a fragmentary side elevational view of the leading end of the noncircular punch.
Figure 6:
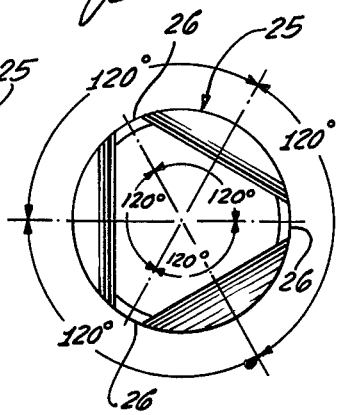
FIG. 6 is an end view of the punch as seen along the line 6—6 of FIG. 5.

FIGS. 5 and 6 show the configuration of the leading end of a three-lobe punch 25 that is employed for conversion deformation of the hollow screw body 18. As shown in FIG. 6 the leading end of the punch is of the cross-sectional configuration of an equilateral triangle, the punch being formed with three radial lobes 26 of equal circumferential dimensions at equal circumferential spacing. It is important to note that the leading end of the punch 25 is beveled so that the leading end of each of the lobes 26 has a bevel face 28. FIG. 9 shows how the bevel face 28a of a punch 25a may have a different angle of taper and also shows that the conical surface 24a may also have different angle of taper. In general, it is preferred that the angle of taper of the bevel face of the punch does not exceed the angle of taper of the conical surface of the bore. The important consideration is that the bevel faces 28 and 28a are defined by straight lines as viewed in profile and that the inner diameter of the end bevel of the punch be no larger than the inside diameter of the reduced portion 22 of the bore.

The advantage of the described geometry of the working end of the punch is that as the punch advances against the material of the screw body, the interface between the punch and the opposing metal of the screw body is at a constant angle relative to the axis of the screw body and, therefore, the resultant direction of outward displacement of the opposing metal is constant. It has been found that with this constant relationship, the conversion deformation of the metal may be closely controlled for producing uniform final products. It is also an advantage that the rate of displacement of the metal relative to the rate of axial advance of the punch may be readily varied by varying the bevel angle of the punch.

FIG. 8 shows how the three lobes 26 of the punch 25 create three corresponding radially protruding lobes 30 in the externally threaded portion of the screw, the external screw thread 12 being deformed to follow the configuration of the lobes with the pitch diameter of the screw thread correspondingly increased at each of the three lobes. It is to be noted that the three lobes 26 of the punch form three corresponding longitudinal recesses 32 in the wall of the reduced inner end portion 22 of the stepped bore.

After the punch 25 is withdrawn from the screw body shown in FIG. 8, the screw body is bored for the purpose of reducing the thickness of the circumferential wall of the tubular portion of the screw body, the purpose of thinning the circumferential wall being to reduce resistance of the circumferential wall to flexure for elastic deformation. Thus, the final boring step to reduce the thickness of the circumferential wall determines the spring rate of the previously mentioned three sectors of the circumferential wall.

In the preferred practice of the invention, the diameter of the tool that is employed for the final boring action is sufficient to eliminate the three longitudinal recesses 32 inside the tubular portion of the screw but it is to be understood that it is within the purview of the invention to use a final boring tool of lesser diameter so that the longitudinal recesses 32 are merely reduced in depth instead of being completely eliminated. With the diameter of the final boring tool sufficient to eliminate the recesses 32, the result is the final product shown in FIGS. 1-3.

FIG. 10 which corresponds to FIG. 3 shows how a screw of the character described may be formed with three lobes that are equally spaced circumferentially of the screw as measured from the centers of the lobes with two of the lobes 34 of relatively large dimension as measured circumferentially of the screw and with the third lobe 35 of substantially smaller dimension. FIG. 10 also shows diagrammatically two relatively strong coil springs 34a that represents the elastic resistance to inward displacement of the two lobes 34 and shows a third weaker coil spring 35a which represents the lesser elastic resistance of the third lobe 35, it being assumed that the inner ends of the three springs are interconnected to a common point 36.

It is apparent that in FIG. 3 where the three lobes are of uniform spacing and uniform dimension, the hypothetical common point 39 of the three springs will be constantly on the axis of the screw as the three springs are equally compressed. In FIG. 10, however, the different spring rate of the third spring 35a will cause the common point 38 to shift away from the axis of the screw.

It has been found by careful tests that if the three lobes of a screw are asymmetrical either with respect to their circumferential spacing or with respect to their circumferential dimensions, the screw actually shifts laterally in response to the radial inward pressure on the three lobes by the complementary internal screw thread and that, as a result, the screw has increased capability for self-locking cooperation with a variety of complementary internal screw threads. In other words, the result is that the screw is capable of self-locking cooperation with a wider range of sizes and fits of complementary external screw threads. It has been further found by careful tests that such a screw with an asymmetrical arrangement of three lobes has increased reusability, the drop in both the installation torque and the breakaway torque being greatly reduced for a given number of cycles of reuse.

The manner in which the screw shown in FIG. 10 may be fabricated, may be understood from FIG. 11 in the light of the description of the method of fabrication of the first embodiment of the invention shown in FIGS. 1-3. FIG. 11 which corresponds to FIG. 8 shows how a punch 40 carries out the conversion deformation of a screw body 42. The punch 40 has three lobes at equal circumferential dimension as measured from center to center, the three lobes comprising two lobes 34b of relatively large circumferential dimension and a third narrower lobe 35b. The final boring step converts the screw body 42 to the final configuration shown in FIG. 10.

FIG. 12 shows a screw of the same general character having three lobes at equal circumferential spacing with one lobe 44 of substantially larger circumferential dimension than the other two lobes 45. Thus, the resiliency behavior of the three sectors of the screw is analogous to the resilient behavior of a relatively heavy coil spring 44a in combination with two relatively light coil springs 45a.

FIG. 13 shows how the required conversion deformation of a screw body 46 may be carried out by means of a punch 48 having a relatively large lobe 44b and two smaller lobes 45b. The final boring of the screw body 46 produces the final screw configuration shown in FIG. 12.

FIG. 14 is a view similar to FIGS. 10 and 12 showing a screw having three lobes 48 which are of equal dimension circumferentially of the screw but are unequally spaced. The analogous three coil springs 48a that are shown diagrammatically are of equal spring rates but are spaced apart by unequal angles. Here again, the asymmetrical arrangement of the lobes causes the screw to be shifted radially by a complementary internal screw thread and the asymmetry results in improved reusability and enables the screw to cooperate with self-locking action with a greater range of sizes of complementary internal screw threads.

The fabrication of the screw shown in FIG. 14 involves the use of a punch or mandrel 50 which, as shown in FIG. 15, is employed for the deformation conversion of a bored and counterbored screw body 52. As indicated in FIG. 15, the three lobes 48b of the mandrel are equal but are of unequal spacing. After the screw body 52 is deformed as shown in FIG. 15 it is bored to produce the screw configuration shown in FIG. 14.

FIG. 16 shows the cross-sectional configuration of a screw of the character described that has three lobes at unequal circumferential spacing with two of the lobes 54 of relatively large circumferential extent and with the third lobe 55 of substantially lesser size. This arrangement is analogous to an arrangement of two relatively strong coil springs 54a coacting with a weaker third spring 55a. The asymmetrical arrangement is advantageous for the reasons heretofore explained.

FIG. 17 shows how a mandrel 56 may be employed to deform a screw body 58 for the purpose of producing the screw shown in FIG. 16. The mandrel has two relatively large lobes 54b and a smaller third lobe 55b with the three lobes at unequal circumferential spacing as measured from center to center.

Figure 19:
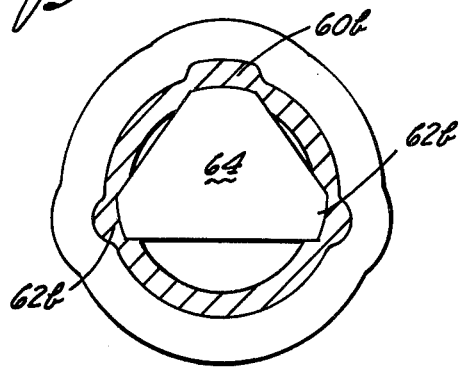
FIG. 19 is a view similar to FIG. 17 showing how a punch is employed to form the the three lobes of the screw shown in FIG. 18.

FIG. 18 shows the cross-sectional configuration of a screw having a single relatively large lobe 60 and two relatively small lobes 62 at unequal circumferential spacing. This arrangement of lobes is analogous to an arrangement of one relatively large radial coil spring 60a in combination with two weaker radial coil springs 62a. The mandrel 64 shown in FIG. 19 that is used in the production of the screw shown in FIG. 18 has a relatively large lobe 60b and two relatively small lobes 62b with the three lobes at unequal circumferential spacing.

Figure 21:
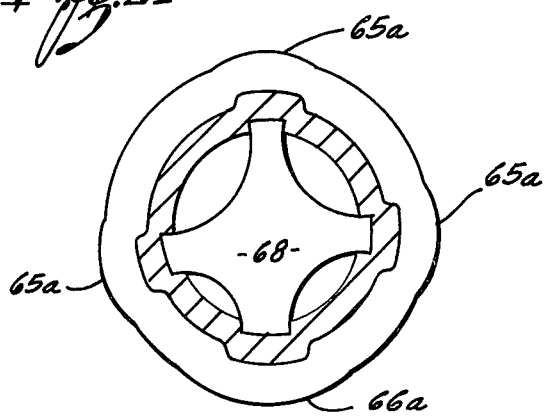
FIG. 21 is a view similar to FIG. 19 showing how a punch with four radial lobes may be employed to produce the four lobes of the screw shown in FIG. 20.
Figure 20:
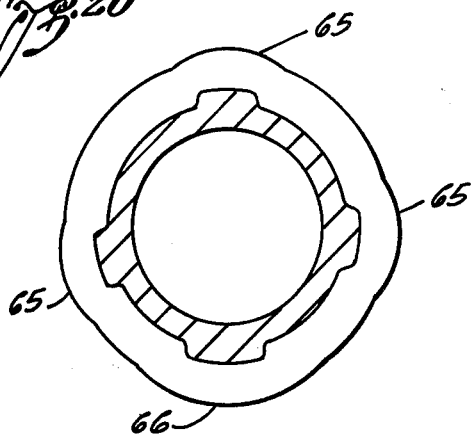
FIG. 20 is a view similar to FIG. 18 showing a four-lobe screw.

The screw shown in cross section in FIG. 20 is an example of the embodiment of the invention that has more than three lobes. This particular screw has three lobes 65 which are of substantially equal size and a fourth substantially larger lobe 66, the four lobes being of unequal circumferential spacing as measured center to center. FIG. 21 shows how a mandrel 68 used in the productions of the screw shown in FIG. 20 has three lobes 65a of substantially the same size and a fourth lobe 66a of larger size, the four lobes being unequally spaced circumferentially of the screw.

Figure 22:
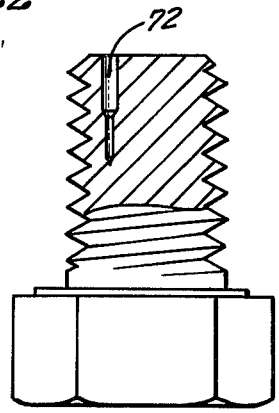
FIGS. 22, 23 and 24 illustrate successive steps in the production of a screw having a single radial lobe.
Figure 23:
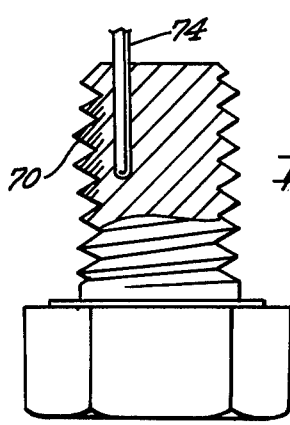
Figure 24:
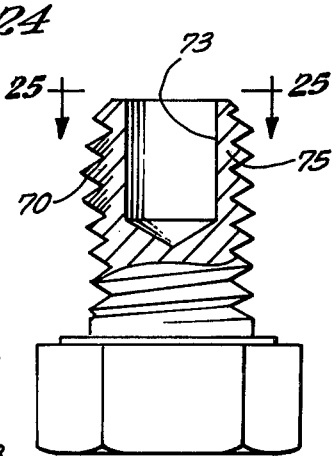
Figure 25:
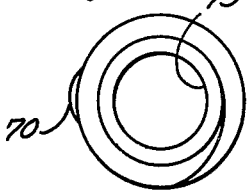
FIG. 25 is an end view of a finished lobe as seen along the line 25—25 of FIG. 24.
Figure 26:
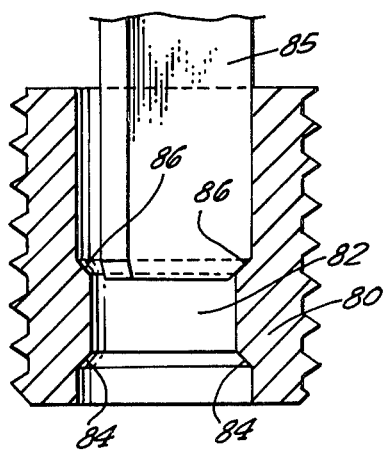
FIG. 26 is a sectional view showing how a solid externally threaded metal body may be bored and counterbored as the first step in the production of a self-locking internally and externally threaded tubular insert and also showing a noncircular punch positioned to carry out the conversion deformation of the body.

FIGS. 22 and 23 illustrate the initial steps of converting a conventional solid non-yielding externally threaded screw into an elastic screw having a single radially outwardly protruding lobe, the finished screw being illustrated by FIGS. 24 and 25 where it can be seen that the threaded portion of the screw has a single radial lobe 70. The first step illustrated by FIG. 22 is to bore and counterbore the screw externally to produce a relatively small stepped bore 72 that is relatively close to one side of the screw. The next step illustrated in FIG. 23 is to force a punch 74 into the stepped bore, the leading end of the punch being of circular configuration but being formed with a conically curved nose for reasons heretofore explained. With the punch 74 of larger diameter than the reduced inner portion of the stepped bore 72, the forcible advance of the punch forms the desired single boss 70. The final step is to form a relatively large concentric bore 73 in the screw that gives the leading end of the screw a tubular configuration with a relatively thin elastically yieldable circumferential wall 75.

FIGS. 26-41 show how the same principles may be applied to the production of internally and externally threaded tubular inserts. The external and internal screw threads of such an insert are employed to engage complementary internal and external screw threads respectively of two complementary members for the purpose of interconnecting the two members.

The first step in the production of an internally and externally screw threaded tubular insert is to provide a solid cylindrical body of metal that is formed with an external screw thread. Next, the body is bored axially and counterbored, the result being illustrated in FIG. 26 where an externally threaded metal body 80 is first bored clear through and is then counterbored from its opposite ends to result in a bore therethrough with an intermediate portion 82 of the bore of reduced diameter, the bore being of stepped configuration with two inner circumferential transition shoulders 84.

The next step is to forcibly insert a punch 85 of noncircular cross-sectional configuration, the punch being of smaller cross dimension than the reduced portion 82 of the bore. The leading end of the punch 85 is beveled as indicated at 86 in the manner and for reasons heretofore discussed.

Figure 27:
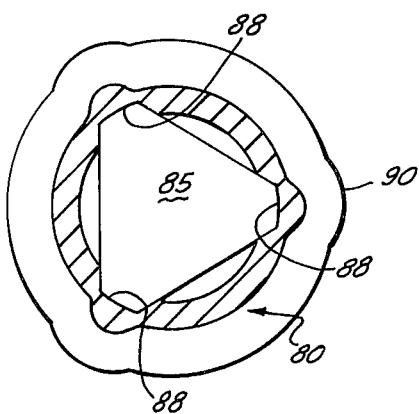
FIG. 27 is a cross-sectional view showing how the punch shown in FIG. 26 may be advanced to form three equally spaced and equally dimensioned lobes on the threaded metal body.

In this example, the punch 85 is of the cross-sectional configuration shown in FIG. 27, the punch having three lobes 88 of equal size at equal circumferential spacing. As indicated in FIG. 27 the punch 85 produces three corresponding lobes 90 in the body 80 with the three lobes of equal size and equal spacing.

Figure 28:
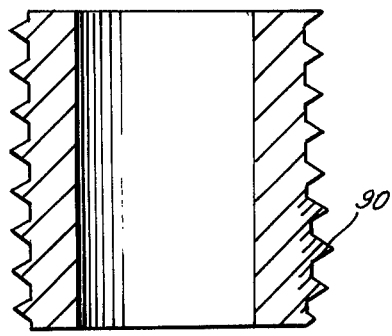
FIG. 28 is an axial section of the externally threaded body showing how the body is bored to a uniform inside diameter after the lobes shown in FIG. 27 are formed.

The next step in the preferred practice of the invention is to drill the body 80 concentrically to result in the screw body 80 having an uniform axial bore 92 as shown in FIG. 28. The body configuration shown in FIG. 28 has a circumferential wall that is of uniform thickness except that the wall is thickened in the region of the three lobes 90. The final step is to tap the bore 92 to form an internal screw thread 94 as shown in FIG. 29, the result being the desired final product with three equally spaced lobes 90 of equal size.

Figure 29:
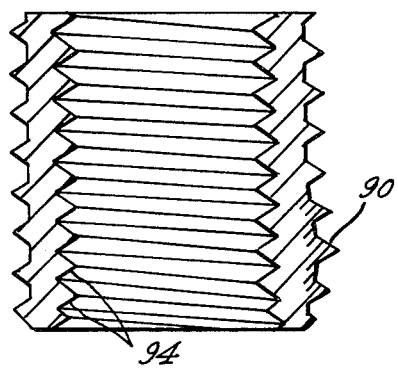
FIG. 29 is a sectional view similar to FIG. 28 showing how tapping the axial bore of the metal body shown in FIG. 28 forms an internal screw thread to result in the final tubular insert configuration.
Figure 30:
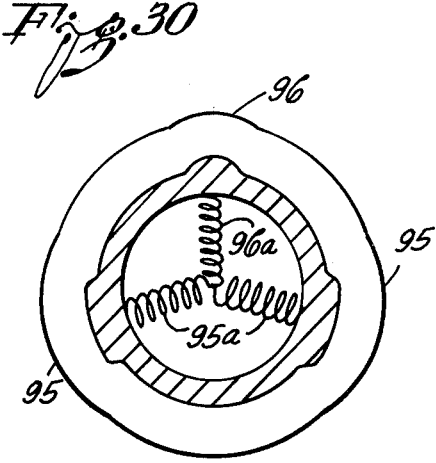
FIG. 30 is a transverse sectional view of a threaded tubular insert having three lobes at equal circumferential spacing with two of the lobes of greater circumferential extent than the third lobe.

FIGS. 30-34 show various asymmetrical tubular inserts that may be produced in the same general manner as the insert shown in FIG. 29. The tubular insert shown in FIG. 30 is of asymmetrical cross-sectional configuration as the previously described screw shown in FIG. 10, the tubular insert having two relatively large lobes 95 and a third relatively small lobe 96 with the three lobes at equal circumferential spacing. The analogous diagrammatic spring arrangement consists of two relatively heavy coil springs 95a combined with a third weaker coil spring 96a, the three springs being at equal angles relative to each other. The mandrel to produce such an insert is the mandrel 40 shown in previously described FIG. 11.

Figure 31:
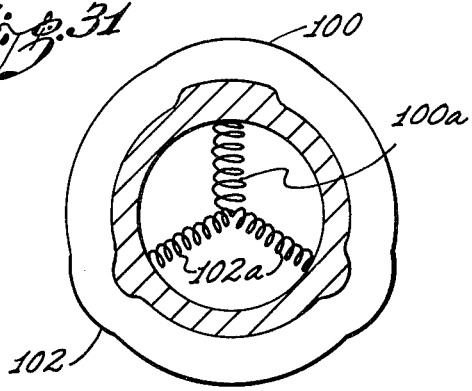
FIG. 31 is a sectional view similar to FIG. 30 showing a three-lobe tubular insert with one lobe of greater circumferential extent than the other two lobes and with the three lobes at equal spacing circumferentially of the insert as measured from the centers of the lobes.

FIG. 31 shows a tubular insert, generally designated 98, that is similar in corss-sectional configuration to the previously described screw shown in FIG. 12, the insert having one relatively large lobe 100 and two relatively small lobes 102 at equal circumferential spacing, the lobe arrangement being equivalent to one relatively heavy coil spring 100a in combination with two lighter coil springs at equal angles. The punch employed in the fabrication of the insert is the punch 48b in previously described FIG. 13.

The tubular insert shown in FIG. 32 is similar to the previously described screw shown in FIG. 14, the insert having three lobes 102 of equal size at unequal circumferential spacing. The equivalent spring arrangement comprises three springs 102a of equal size but at unequal circumferential spacing. The punch or mandrel employed for the conversion deformation is the punch 50 shown in previously described FIG. 15.

The tubular insert 104 shown in FIG. 33 is similar to the previously described screw shown in FIG. 16, the insert having two relatively large lobes 105 and a smaller third lobe 106 with the three lobes at unequal circumferential spacing. The mandrel or punch that is used in fabricating the insert in FIG. 16 is the mandrel 56 shown in FIG. 17.

The insert 108 in FIG. 34 is similar in construction to the previously described screw in FIG. 18, the insert having one relatively large lobe 110 and two smaller lobes 112 with the three lobes at unequal circumferential spacing. The equivalent diagrammatic spring arrangement comprises a single relatively heavy coil spring 110a in combination with two lighter coil springs 112a. The mandrel that is used is the mandrel 64 shown in FIG. 19.

FIGS. 35–39 illustrate the method steps for the production of an internally and externally screw threaded tubular insert that has a single radially protruding lobe. First, and externally threaded solid metal body 114 shown in FIG. 35 is eccentrically bored and counterbored near one side thereof to produce a blind stepped bore 115 of relatively small diameter. A mandrel 116 which may be of circular cross-sectional configuration with a conically tapered nose 118 is then forced into the bore to expand the reduced inner portion of the bore with the resultant formation of a single radially protruding lobe 120 as shown in FIG. 36. The next step in the preferred practice of the invention is to bore the body 114 from end to end to eliminate the relatively small eccentric bore and to substitute a relatively large concentric bore 122 shown in FIG. 27. The final step is to tap the bore 122 to form an internal screw thread 124 to result in a finished insert 125 with a single radial lobe 120 shown in FIGS. 38 and 39.

An important feature of the preferred practice of the invention is that the annular wall of the tubular insert is relatively thin to permit the annular wall to be flexed radially inwardly by the pressure on the lobe or lobes of the tubular insert by a surrounding complementary screw thread. Thus, FIG. 38 indicates by shading the above-mentioned external lobe 120 of the tubular insert. When the tubular insert shown in FIG. 38 is screwed into the threaded bore of a complementary member 126 shown in FIG. 40, the complementary internal screw thread 127 of the complementary member acting on the lobe 120 flexes the annular wall of the insert radially inwardly and thus, in effect, creates an internal lobe 128 indicated by shading in FIG. 40. FIG. 40 shows a second complementary member in the form of a screw 129 having complementary external screw thread 130, the view showing the screw in the course of its advance into the insert. It can be seen that the internal lobe 128 is in the path of advance of the screw 129 for locking cooperation with the screw.

An important advantage of such a resilient tubular insert is that the external locking torque of the insert is related to the internal locking torque. Thus, the external locking torque, i.e., the resistance of the installed insert to rotation relative to the surrounding member 126 is related to the internal torque of the resistance of the installed insert to loosening rotation of the installed screw 129. The relationship may be understood when it is considered that the greater the radial protuberance of the external lobe 128 in FIG. 38 the more pronounced the resulting internal lobe 128 shown in FIG. 40.

If the insert in FIG. 40 were a conventional insert, the internal torque might exceed the external torque to that rotation of the screw would cause undesirable rotation of the tubular insert. In contrast, the particular insert shown in FIG. 40 has the advantage that a rise of the internal torque tends to cause a corresponding rise of the external torque. Thus, when the internal lobe 128 in FIGS. 40 is placed under radially outward pressure by the advancing screw thread 130 to create locking action between the screw and the insert, the pressure is transmitted radially outwardly against the surrounding complementary member 126 with consequent rise in the resistance of the insert to rotation relative to the surrounding member.

If it is desirable to provide either a screw or a tubular insert with three relatively small radial lobes, the same method of fabrication may be used to produce the insert illustrated by FIG. 41. The resulting three lobes 131 are of smaller circumferential dimension and bulge outwardly with curvatures of smaller radii than the lobes produced by the procedures illustrated in FIGS. 26–34.

FIG. 42 shows an intermediate stage in the production of either an elastic screw of the configuration shown in FIGS. 43 or 44. A solid nonelastic screw 135 shown in FIG. 42 is first produced by a rolling operation that is carried out in such manner as to give the screw the cross-sectional configuration of a triangle with rounded corners. Preferably, but not necessarily, the solid screw shown in FIG. 42 has a screw thread 135 of the configuration shown on an enlarged scale in FIG. 44. It can be seen that the screw thread 136 has a radially inward portion or base portion 138 that tapers in cross-sectional configuration at a given angle and has a radially outward or crest portion 140 that tapers at a smaller angle. Thus, the screw thread 136 is sharper than a conventional screw thread.

The final step is to form a longitudinal bore 142 in the screw body 135 as shown in FIG. 43. The bore 143 is substantially concentric. The result is a screw which has three sectors with a lobe 144 in the form of a longitudinal rib at the midpoint of each sector. It will be noted that the wall of the bored portion of the tube is relatively thin at three points 145 each of which is equidistant between two of the lobes 144.

The screw shown in FIG. 45 is produced in the same manner except that the screw body 135 is bored eccentrically to produce a relatively small bore 146 that is close to one of the three lobes 144. The resultant screw shown is elastically deformable at only the single lobe 144 that is nearest the bore 146.

My description in specific detail of the selected embodiments of the invention will suggest various changes substitutions and other departures from my disclosure within the spirit and scope of the invention.

We claim:

1. In a metallic screw fastener having an external screw thread for engagement with an internal screw thread of a complementary member, the improvement for self-locking cooperation with the complementary member, comprising:

at least a portion of the length of the fastener being of generally tubular configuration with a circumferential wall of uniform inside diameter;

at least a portion of said external screw thread being formed on the exterior of said circumferential wall;

said circumferential wall having a plurality of circumferentially spaced thickened portions with each of the thickened portions projecting radially outwardly from the exterior surface of said wall to form a corresponding plurality of radially outward extending lobes;

each of said lobes having a circumferential extent which is substantially less than 180°;

said external screw thread conforming with the cross sectional configuration of said lobes with the pitch diameter of the external screw thread being locally increased by the lobes;

said wall having an inner circumferential surface which is smooth and is generally concentric to the longitudinal axis of the fastener;

said circumferential wall having a uniform radial dimension as measured from its inside diameter to the major diameter of said external screw thread except at the regions of the lobes, and said wall being sufficiently thin to permit resilient deformation of the wall at the regions of said lobes when the lobes are engaged for interference fit with an internal screw thread of a complementary member with the smooth inner circumferential surface of the wall providing a reduction in the stress concentration within the wall during its resilient deformation.

2. An improvement as set forth in claim 1 in which the circumferential wall has three thickened portions forming three corresponding radially outward lobes.

3. An improvement as set forth in claim 2 in which the three lobes are equally circumferentially spaced as measured center to center.

4. An improvement as set forth in claim 3 in which the dimensions of the lobes measured circumferentially of the fastener are equal.

5. An improvement as set forth in claim 3 in which the dimensions of the three lobes measured circumferentially of the fasteners are unequal.

6. An improvement as set forth in claim 2 in which the three lobes are of unequal spacing circumferentially of the fastener as measured from the centers of the lobes.

7. An improvement as set forth in claim 6 in which the dimensions of the three lobes as measured circumferentially of the fastener are equal.

8. An improvement as set forth in claim 6 in which the dimensions of the lobes as measured circumferentially of the fastener are unequal.

9. The metal screw fastener of claim 1 including a blind longitudinal bore in the leading end of the screw fastener with the blind longitudinal bore forming said circumferential wall.

10. An improvement as set forth in claim 9 in which the screw has three lobes spaced apart circumferentially of the circumferential wall to cooperate with the complementary internal thread of the complementary member, the resiliency of the circumferential wall resisting radially inward displacement of the lobes by the complementary internal screw thread.

11. An improvement as set forth in claim 10 in which the three lobes are dimensioned and circumferentially spaced for unequal resilient resistance to radially inward displacement of the lobes by the complementary internal screw thread for increased reusability of the screw and to make the screw capable of self-locking action with a wider range of pitch diameters of the complementary internal screw thread.

12. An improvement as set forth in claim 10 in which the three lobes as measured from center to center are of unequal spacing circumferentially of the fastener.

13. An improvement as set forth in claim 12 in which the dimensions of the lobes as measured circumferentially of the fasteners are substantially equal.

14. An improvement as set forth in claim 12 in which the dimensions of the three lobes as measured circumferentially of the fastener are unequal.

* * * * *